US012811878B2

(12) United States Patent
Kappla et al.

(10) Patent No.: US 12,811,878 B2
(45) Date of Patent: Nov. 24, 2026

(54) UTILIZING RULES AT A UPF FOR TRAFFIC STEERING IN A MOBILE EDGE COMPUTING NETWORK

(71) Applicant: Microsoft Technology Licensing, LLC, Redmond, WA (US)

(72) Inventors: Srinivas Kappla, Nashua, NH (US); Sontu Mazumdar, Bengaluru (IN); Satish Gundu, Bangalore (IN); Srikiran Kalakonda, Leander, TX (US); Rajesh Palakkal, Groton, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 297 days.

(21) Appl. No.: 18/428,845

(22) Filed: Jan. 31, 2024

(65) Prior Publication Data

US 2025/0247329 A1 Jul. 31, 2025

(51) Int. Cl.
*H04L 45/74* (2022.01)
*H04L 45/00* (2022.01)
*H04L 45/42* (2022.01)

(52) U.S. Cl.
CPC ............ *H04L 45/42* (2013.01); *H04L 45/566* (2013.01); *H04L 45/74* (2013.01)

(58) Field of Classification Search
CPC ........ H04L 45/42; H04L 45/566; H04L 45/47
See application file for complete search history.

(56) References Cited

U.S. PATENT DOCUMENTS 12,088,501 B2 * 9/2024 Li ........................ H04L 12/1407
2019/0335002 A1 * 10/2019 Bogineni ............ H04L 41/0803
2020/0267077 A1 * 8/2020 Williams ............ H04L 47/2441
2020/0404739 A1 * 12/2020 Thiebaut ............... H04L 12/185
2022/0006735 A1 * 1/2022 Lee ......................... H04L 61/00
2022/0060416 A1 * 2/2022 Zhu ......................... H04W 4/08
2022/0060970 A1 * 2/2022 Zhu ....................... H04L 45/302
2022/0109633 A1 * 4/2022 Li ........................ H04L 12/1407
2022/0109962 A1 * 4/2022 Zhu ......................... H04W 4/06
2022/0182321 A1 * 6/2022 Landais .................. H04L 45/74
2022/0385571 A1 * 12/2022 Dhammawat ....... H04L 47/2441
2023/0058366 A1 * 2/2023 Perez Martinez .. H04L 41/5051
2023/0336432 A1 * 10/2023 Muñoz De La Torre Alonso ....... H04L 12/1407
2023/0412506 A1 * 12/2023 Zhang ..................... H04L 45/42
2025/0324378 A1 * 10/2025 Manithara ............... H04L 67/12
2025/0386247 A1 * 12/2025 Li ......................... H04W 16/10

* cited by examiner

*Primary Examiner* — Abdelnabi O Musa
(74) *Attorney, Agent, or Firm* — Ray Quinney & Nebeker P.C.; James Bullough

(57) ABSTRACT

The present disclosure relates to a system and method for steering traffic on a local edge network. A network function (NF) located on the edge network installs one or more packet detection rules (PDRs), wherein the one or more PDRs includes a first route rule with a routing tag. The NF receives a data packet and identifies one or more packet attributes of the data packet. The NF examines the one or more packet attributes against the one of the one or more PDRs, wherein examining the one or more packet attributes includes matching the one or more packet attributes to the first PDR. The NF may route the data packet in accordance with a forwarding action rule (FAR) attached to the first PDR to a local data network of an edge network.

20 Claims, 9 Drawing Sheets

UTILIZING RULES AT A UPF FOR TRAFFIC STEERING IN A MOBILE EDGE COMPUTING NETWORK

BACKGROUND

Edge computing as an evolution of cloud computing brings application hosting from centralized data centers down to the network edge, closer to consumers and the data generated by applications. The 5G networks based on the 3GPP 5G specifications define the enablers for edge computing, allowing the edge computing system and the 5G networks to collaboratively interact in traffic routing and policy control related operations. The edge computing architecture where computation and data storage is brought closer to the end users allows to process and deliver data faster, which may improve response times and may provide better bandwidth availability. When data is processed locally, latency is significantly reduced. This is especially beneficial for streaming services, such as video, audio, and gaming experiences.

The subject matter in the background section is intended to provide an overview of the overall context for the subject matter disclosed herein. The subject matter discussed in the background section should not be assumed to be prior art merely as a result of its mention in the background section. Similarly, a problem mentioned in the background section or associated with the subject matter of the background section should not be assumed to have been previously recognized in the prior art.

DETAILED DESCRIPTION

Figure 1:
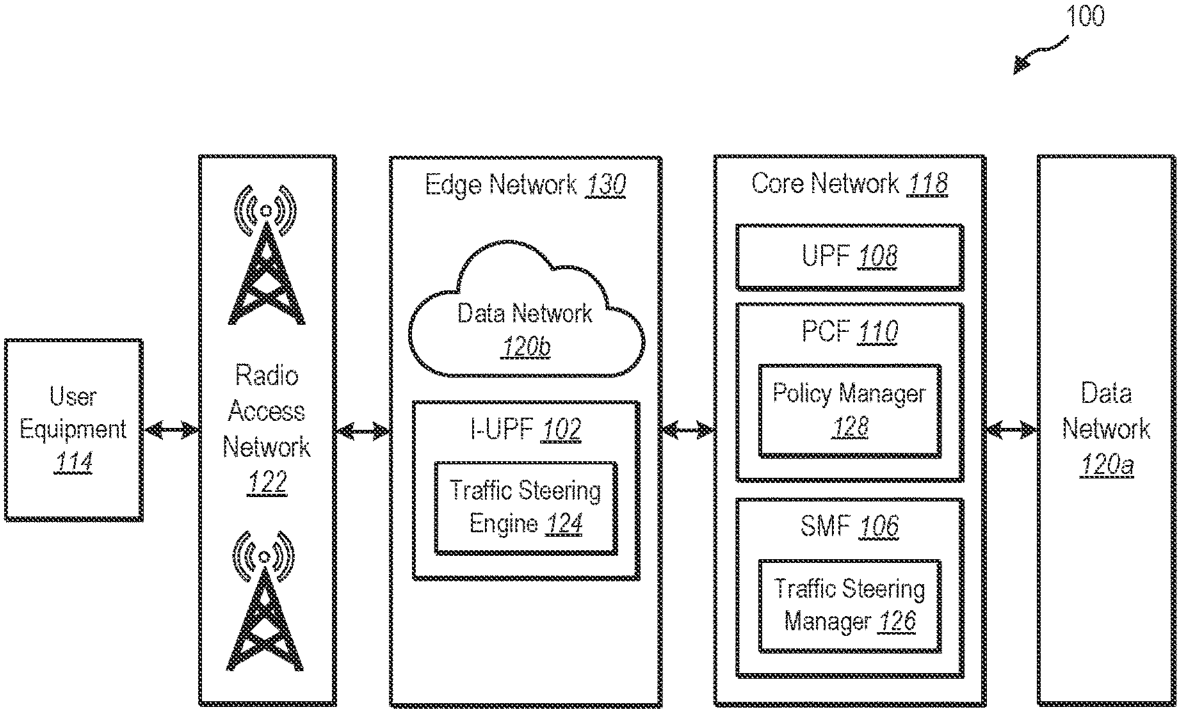
FIG. 1 illustrates an example environment showing example implementations of systems for steering traffic in a telecommunications network.

The present disclosure relates generally to traffic steering in a communication network, such as the 5G telecommunication network. In particular, the present disclosure provides an improvement to conventional methods for traffic steering using packet detection rules (PDRs) including a route rule having a routing tag that facilitates steering network traffic based on packet attributes of one or more received data packets. As will be discussed in further detail below, the present disclosure describes systems for steering network packets to one or more UPFs within a core network and/or edge network based on an examination of packet attributes against the PDR(s) and routing the data packet in accordance with the route rule of the relevant PDR(s).

By way of example, features of the systems described herein involves installing or causing PDRs to be installed at a UPF to be used for steering network traffic and where the PDR includes a route rule with a routing tag. A UPF receives a data packet, identifies one or more packet attributes of the data packet, and examines the packet attribute(s) against the PDR(s). Based on a match between the attribute(s) and the PDR(s), the UPF causes the data packet to be routed in accordance with a forwarding action rule (FAR) attached to a PDR. As will be discussed below, this may involve routing the packet to one or more of a local data network of an edge network or a core network of a telecommunications network.

Conventionally, traffic steering utilizes packet filters based on an IP address (or IP prefix) of a local application server to offload traffic to them. These packet filters need to be known in advance and configured to relevant network functions (such as PCF, SMF, and UPF) before traffic can be steered to them. When a new server comes online, these new IP addresses (or IP prefixes) need to be updated to the packet filter rules stored by the network functions. Similarly, when a server is moved, and it obtains a new IP address, the new IP address (or the IP prefix) needs to be updated to the packet filters stored by the network functions. Managing and updating these packet filter rules may be challenging and expensive for a network operator. Typically, a SMF configures all UPFs with the updated packet filter rules. As the number of new servers grow steadily, it may present a problem as the packet filter rules would require almost continuous updates, hence causing continues control plane traffic between SMF and UPFs. Furthermore, the size of the packet filter rules may also grow, requiring more processing power and storage abilities from the network functions. In addition, in many cases, these packet filter rules are manually entered into the system as part of the enterprise offload product offering.

The features and functionalities described herein provide a number of advantages and benefits over conventional approaches and systems. It will be appreciated that the advantages and benefits discussed herein are provided by way of example and are not intended to be an exhaustive list of all possible advantages and benefits of implementations of the socket and methods described herein. By way of example, the systems described herein provide features and functionalities related to installing a plurality of packet detection rules (PDRs) where each PDR includes a forwarding action rule (FAR) providing routing instructions to packets based on packet attributes that matches the PDR rules. Indeed, by including a route rule within the one or more of the PDRs, steering network traffic can be greatly simplified in many use-cases, particularly when steering traffic from an edge network.

As another example, in one or more embodiments, the route rules may be established by receiving route tags via border gateway protocol (BGP) from a data network. Indeed, by dynamically establishing route rules as part of the PDR on a local network function, the systems described herein allow a simple and convenient way to maintain traffic steering on a local level without necessarily storing route rules relating to other local networks. This may result in higher data packet processing and forwarding capabilities on a local network function, and/or saved resources.

In addition, by providing a more detailed granularity on a PDR in the form of route rules, as described herein, features and functionalities described herein may result in reduced network costs, improve network performance and reliability, and improve user experience when packet detection rules include route rules fetched from a BGP. This is further improvement over conventional traffic steering in which packet filter rules need to be maintained on a centralized manner and then configured to all relevant network functions.

As illustrated in the foregoing discussion, the present disclosure utilizes a variety of terms to describe features and advantages of one or more embodiments of the route rule establishment and methods for facilitating dynamic traffic steering based on route rules. Additional detail will now be provided regarding the meaning of some of these terms. Further terms will also be discussed in detail in connection with one or more embodiments and specific examples below.

As used herein, a "traffic steering" refers to a mechanism for directing network traffic based on network conditions. Indeed, in one or more implementations, traffic steering refers to technologies that use intelligent algorithms to dynamically or statically select an optimal path for network traffic based on real-time network conditions. In the context of edge networks, a network function, such as a UPF or a gateway may steer some of the traffic to one or more local data networks.

In one or more embodiments described herein, an "Application Server," or AS, refers to a server providing services to one or more user equipments (UEs). For example, an application server may refer to a video streaming server that provides video streaming service to one or more UEs. In another example, an application server may refer to a social media server that provides social media services to one or more UEs. In yet another example, an application server may refer to a gaming server providing online gaming services to one or more UEs.

As used herein, a "Policy Control Function," or PCF, refers to a network function in the core network of a communication network, such as the 5G telecommunication network. The PCF supports unified policy framework to govern network behavior and provides Policy Control Rules (PCC) to a session management function (SMF) to be applied to data traffic. The PCC rules are used to manage, among other things, a quality of service (QOS), traffic routing, and charging aspects in the network.

In one or more embodiments described herein, a "Session Management Function (SMF) refers to a network function in the core network of a communication network, such as the 5G telecommunication network. The SMF establishes, modifies, and releases tunnels between user plane function (UPF) and an access network node. The SMF also provides packet handling instructions in the form of a Packet Detection Rule (PDR) to the UPF for the UPF to steer traffic to the local edge network. In one or more embodiments described herein, packet handling instructions are generated by the SMF using traffic routing information in the PCC rules.

As used herein, a "packet detection rule" or "PDR" refers to a set of rules or criteria used to identify and classify packets based on the data packets attributes. For example, a PDR may include a packet filter rule. The packet filter rule may be used to identify one or more data packets (e.g., IP or Ethernet flows). In one or more embodiments, the packet filter rule may be used to classify data packets based on the packet attributes, such as a source/destination IP address or IP prefix and to provide different level of service (QoS) to them based on the rules in the PDR. In one or more embodiments, PDR includes a route rule. The route rule may refer to a subcomponent of the PDR, and may be used to classify data packets based on packet attributes, such as network instance (for example a routing domain identifier and/or a virtual routing and forwarding (VRF) identifier), community attribute, extended community attribute, or an AS-specific extended community attribute. In one or more embodiments, a PDR may include both a packet filter rule and a route rule. In one or more embodiments, a PDR is accompanied by a "forwarding action rule" or "FAR" that provides instructions to the network function (e.g., UPF) on how to forward the data packet when it matches a specific PDR. For example, a first PDR may have a first FAR to forward a data packet to a core network, while a second PDR may have a second FAR to forward the data packet to a data network.

In one or more embodiments described herein, a "User Plane Function," or UPF, is a network function on a user plane of a communication network, such as the 5G telecommunication network. The UPF is responsible for packet routing and forwarding in the communication network. The UPF also provides an interconnect point between a mobile communication network (e.g., a Radio Access Network and a Core Network) and a data network. As used herein, a "data network" refers to the internet, an IP multimedia subsystem (IMS), or any enterprise network in a cloud computing system.

In one or more embodiments described herein, a "protocol data unit session," or PDU session, is a logical connection between a user equipment (UE) and the core network, such as the 5G core network. The PDU session connects users to any data network, which may be the Internet, IP multimedia subsystem (IMS), or any enterprise network in a cloud computing system.

Additional detail will now be provided in connection with a traffic steering network function and methods for dynamically steering traffic on an edge network in connection with illustrated examples. It will be appreciated that the implementations shown in the figures are provided by way of example and are not intended to be limiting to those implementations shown. Indeed, many of the examples provide simplified implementations of the socket to illustrate features of the socket that accomplish one or more of the benefits described above.

FIG. 1 illustrates an example environment 100 showing systems and devices that may be implemented in a communication environment. As shown in FIG. 1, the environment 100 may include a core network 118 (e.g., a cellular network, such as a 5G cellular network as defined by the third-generation partnership project (3GPP)), and an external data network 120*a*, such as a data network implemented on a cloud datacenter. Moreover, any portion(s) of the core network may be implemented on a cloud computing system. The environment 100 may additionally include a plurality of user equipment (UE) 114 and a radio access network (RAN) 122 (or simply "RAN 122").

As shown in FIG. 1, some components of the core network 118 and some components of the data network may be implemented on an edge network 130 that are physically implemented at locations that are proximate to or otherwise within closer vicinity of the user equipment 114 (or simply "UE 114") than other components of the core network 118 and the data network 120*a*.

The UE 114 may refer to a variety of computing devices or device endpoints including, by way of example, a mobile device such as a mobile telephone, a smartphone, a personal digital assistant (PDA), a tablet, or a laptop. Alternatively, one or more UEs may refer to non-mobile devices such as a desktop computer, a server device (e.g., an edge network server), or other non-portable devices. In one or more embodiments, the UE 114 refers more generally to any endpoint capable of communicating with devices on a core network 118 or on the edge network 130, such as Internet of Things (IoT) devices, or other Internet-enabled devices. In one or more embodiments, the UE 114 refers to applications or software constructs on corresponding computing devices.

The RAN 122 may include a plurality of RAN stations or sites. In one or more embodiments, each RAN site may include one or more base station nodes and associated RAN components. For example, the base station node may be a NodeB, eNodeB, or gNodeB as defined by 3GPP standards. While the RAN 122 may include components that are entirely separate from the core network 118, one or more embodiments of the environment 100 may include one or more RAN components or services traditionally offered by a RAN site that are implemented on the cloud computing system. Indeed, as communication networks become more complex and further decentralized, one or more components of the RAN 122 may be implemented as virtualized components hosted by server nodes of the cloud computing system, such as on server nodes of an edge network, or on datacenters of the cloud infrastructure.

As shown in FIG. 1, the edge network 130 may include an intermediate UPF (I-UPF) 102. The I-UPF 102 includes a traffic steering engine component 124 that is implements packet routing and forwarding functionalities described herein. The edge network 130 further includes a local data network 120*b* having a connection to both the core network 118 and the UE 114 via the I-UPF 102.

As shown in FIG. 1, the core network 118 may include a policy control function (PCF) 110 that is configured to enforce policies in the core network 118 related to session management services and non-session management services. In particular, the PCF 110 includes a policy manager 128 that may fetch policy data from a data repository, such as a unified data repository (UDR), create a policy control rules (PCC rules), and deliver the PCC rules to other network functions (SMF, UPF, I-UPF, etc.) for enforcement. The core network 118 further includes a UPF 108 that has similar features and functionalities as the I-UPF 102 located on the edge network 130. In addition, the UPF 108 may also provide a protocol data unit (PDU) session anchor functionality in order to support the UE's 114 mobility across various physical locations. In some instances, a data network, such as the data network 120*a* shown in FIG. 1, may directly connect to a UPF 108 without an I-UPF.

The core network 118 may further include a session management function (SMF) 106 that is capable of establishing a protocol data unit (PDU) session between the UE 114 and the I-UPF 102. In addition to establishing the PDU session, the SMF 106 further includes a traffic steering manager 126. The traffic steering manager 126 is configured to receive the PCC rules from the PCF 110 and to create Packet Detection Rules (PDRs) based on the PCC rules. The traffic steering manager 126 may then configure one or more UPFs and I-UPFs according to the PDR rules created.

As will be discussed in further detail below, an I-UPF 102 located on an edge network 130 may compare the packet filter rules identified in the PDR rules to packet attributes of a data packet received and steers the data packet based on a forwarding action rule (FAR) associated with the PDR rule that matches with the packet attributes of the data. In one or more conventional approaches, an I-UPF will examine the destination IP address and compare it to the packet filter rules identifying all available IP addresses or IP prefixes provided by the SMF and forwards the data packet based on a FAR associated with the PDR rule that matches with the destination IP address.

As an addition to the above-process, and as will be discussed in further detail below, the I-UPF 102 may install route rules received from the local data network 120*b* and provide traffic steering to the local data network 120*b* in accordance with one or more embodiments described herein. Indeed, as will be discussed in connection with various examples, the I-UPF 102 may interact with the SMF 106 to receive a plurality of PDRs where at least one of the plurality of PDRs includes a route rule.

Figure 2:
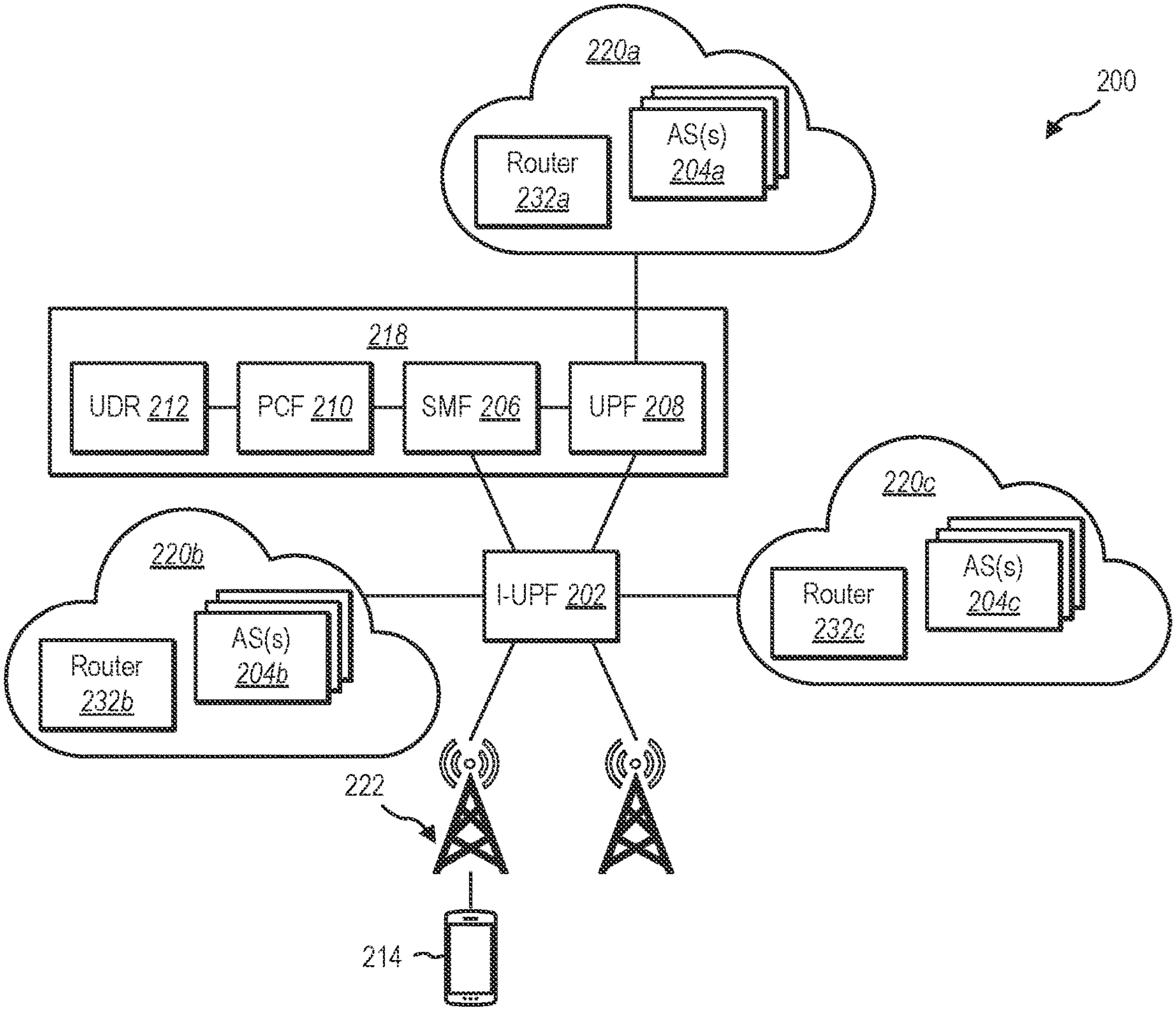
FIG. 2 illustrates a more detailed telecommunications network environment showing implementations for receiving, maintaining, and installing route rules in the telecommunications network.

FIG. 2 illustrates an environment 200 for receiving, maintaining, and installing route rules in a telecommunications network. As shown in FIG. 2, the environment 200 includes a core network 218 (e.g., a cellular network, such as a 5G cellular network as defined by the third-generation partnership project (3GPP)), and three external data networks 220*a*, 220*b*, and 220*c*. Moreover, any portion(s) of the core network may be implemented on a cloud computing system. The environment 200 may additionally include a plurality of user equipment (UE) 214 connected to the I-UPF 202 via a and a radio access network (RAN) 222 (or simply "RAN 222").

As shown in FIG. 2, some components of the core network 218 and some components of the data network may be implemented on an edge network that are physically implemented at locations that are proximate to or otherwise within closer vicinity of the UE 214 than other components of the core network 218 and the data network 220*a*. As shown in FIG. 2, data networks 220*b* and 220*c* are located on edge networks and connected to the core network 218 and the UE 214 through the I-UPF 202. A data network 220*a* is reachable, by the UE 214, through the core network 218. Thus, the data network 220*a* shown in FIG. 2 refers to an internal or non-edge data network. Each of the data networks 220*a*, 220*b* and 220*c*, may include a plurality of application servers (ASs) 204*a*, 204*b*, and 204*c*, and a plurality of routers 232*a*, 232*b*, and 232*c*. Each of the routers 232*a*, 232*b*, 232*c* may store one or more virtual routing and forwarding tables (VRFs) providing the optimal path to each of the ASs located within the data network.

As shown in FIG. 2, the edge network may include an intermediate UPF (I-UPF) 202. The I-UPF 202 includes a traffic steering engine component that is implements packet routing and forwarding functionalities described herein.

As shown in FIG. 2, the core network 218 may include a policy control function (PCF) 210 that is configured to enforce policies in the core network 218 related to session management services and non-session management services. In particular, the PCF 210 includes a policy manager that may fetch policy data from a data repository, such as a unified data repository (UDR) 212, create a policy control rules (PCC rules), and deliver the PCC rules to other network functions (SMF, UPF, I-UPF, etc.) for enforcement. The core network 218 further includes a UPF 208 that has similar features and functionalities as the I-UPF 202 located on the edge network. In addition, the UPF 208 may also provide a protocol data unit (PDU) session anchor functionality in order to support the UE's 214 mobility across various physical locations.

The core network 218 may further include a session management function (SMF) 206 that is capable of establishing a protocol data unit (PDU) session between the UE 214 and the I-UPF 202. In addition to establishing the PDU session, the SMF 206 further includes a traffic steering manager. The traffic steering manager is configured to receive the PCC rules from the PCF 210 and to create Packet Detection Rules (PDRs) based on the PCC rules. The traffic steering manager may then configure one or more UPFs and I-UPFs according to the PDR rules created.

In one or more embodiments, a routing protocol, such as a border gateway protocol (BGP), may be used to exchange routing information between different data networks, and between a data network and a telecommunication network. Typically, a BGP is used to exchange information about IP prefixes or IP addresses of the application servers located in the data network and the best path to reach those IP prefixes or IP addresses. In one or more embodiments, as further discussed below, a routing protocol is used for providing a network instance information. For example, the network instance may be information that identifies a routing domain within the data network. In another example, the network instance may be a VRF of the router located in the data network.

In one or more embodiments, as further discussed below, a routing protocol is used for providing a community attribute and/or an extended community attribute. A community attribute is an optional, transitive attribute that can be added to one or more IP prefixes or IP addresses that the routing protocol carries. For example, a community attribute may be used to group destinations within the data network that share a common property. An extended community attribute is similar to the community attribute by providing an even larger range for grouping or categorizing different communities within the data network. In one or more embodiments, a new subtype value (or simply 'sub-type'), an autonomous system (AS)-specific extended community, is defined to a routing protocol, such as BGP protocol, that is used as part of PDR route classification. An example of a transitive four-octet AS-specific extended community may include: (1) a Type field; (2) a Sub-Type field; (3) a Global Administrator field; and (4) a Local Administrator field. In one example, the Type field may have a value of 0x00 and the Sub-Type field may have a value of 0x07.

The high-order octet (0x02) provides transitive four-octet AS-specific extended community, and the low-order octet (0x07) provides the PDR route rule group subtype. The value fields in this example consist of two sub-fields: a global administrator sub-field (two octets), that contains an autonomous system number assigned by Internet Assigned Numbers Authority (IANA), and a local administrator sub-field (4 octets), that contains a unique ID within an autonomous system.

Another example of transitive four-octet AS-specific extended community is provided below.

Another example of transitive four-octet AS-specific extended community includes a high-order octet (0x02) that identifies a transitive four-octet AS-specific extended community. The subsequent octet (0x07) identifies the AS-specific extended community subtype. The Global Administrator field and Local Administrator field may contain values used to identify the route community.

Similarly, as in the prior example the high-order octet (0x02) provides transitive four-octet AS-specific extended community, and the low-order octet (0x07) provides the PDR route rule group subtype. The difference is found in the value fields. Whereas the prior example provided a 2 octets global administrator subfield, the latter example provides a 4 octets global administrator subfields. Similarly, the prior example provided a 4 octets local administrator subfield, while the latter example provides a 2 octets local administrator subfields.

As shown in FIG. 2, the router **232*b* may use a routing protocol (such as the BGP protocol) to provide the network instance (e.g., routing domain ID and/or VRF), community attribute, extended community attribute, and/or AS-specific extended community attribute together with the IP prefixes or IP addresses to the core network 218. In one or more embodiments, the network instance, community attribute, extended community attribute, and/or AS-specific extended community attribute are stored together with the IP prefixes or IP addresses to a data repository, such as the UDR 212 shown in FIG. 2. Similarly, the router 232*c* and router 232*a* may provide the IP prefixes or IP addresses of the application servers located in their own respective data networks together with the network instance, community attribute, extended community attribute, and/or AS-specific extended community attribute to the core network 218 where they may be stored in the UDR 212**.

In one or more embodiments, the routing protocol provides the IP prefixes or IP addresses and the related network instance, community attribute extended community attribute, and/or AS-specific extended community attribute to the I-UPF 202 located on the edge network, and the I-UPF 202 may store these locally without the need for the SMF 206 to manage them centrally. As shown in FIG. 2, the I-UPF 202 may store the IP prefixes or IP addresses, the network instance, the community attribute, the extended community attribute, and/or AS-specific extended community attribute related to the data network **220*b* and the data network 220*c***.

Figure 3:
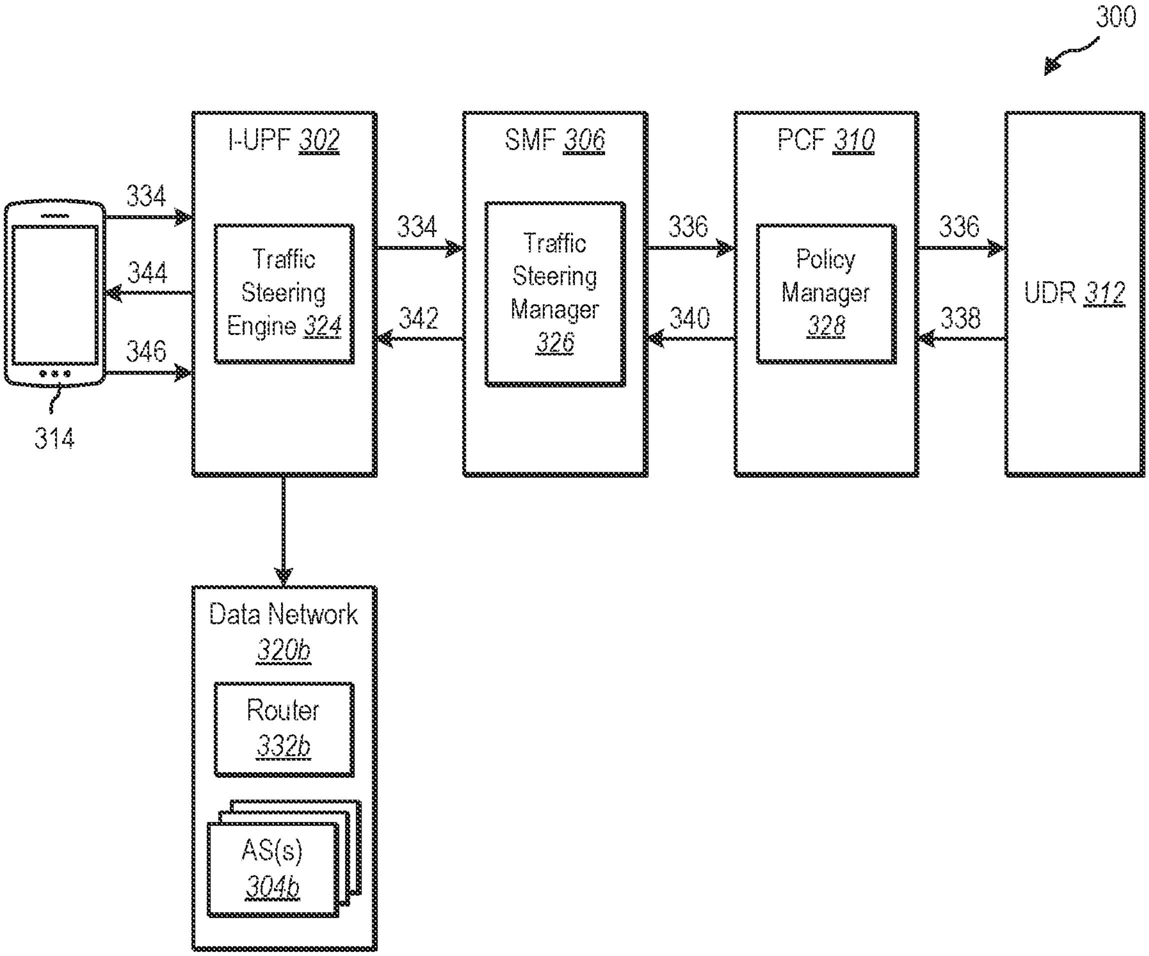
FIG. 3 illustrates an example workflow in which network traffic is steered to a local data network in accordance with a route rule according to one or more embodiments.

FIG. 3 illustrates an example implementation 300 of steering traffic to a local data network when the traffic steering instructions are received from a core network, in accordance with at least one or more embodiments. In the illustrated example, a UE 314 sends a request 334 for service (or a service request) to the I-UPF 302 that delivers it to SMF 306. As part of the session establishment, the traffic steering manager 326 in the SMF 306 requests, from the PCF 310, policy and charging information 336 relating to the UE 314 and to the service request 334. In one or more embodiments, a policy manager 328 of the PCF 310 fetches the policy and charging information 338 from a UDR 312 and creates policy control rules 340 (PCC rules) based on the information received 338. Further examples of example PCC rules are provided in connection with FIGS. 5-7.

As shown in FIG. 3, the PCF 310 then delivers the PCC rules 340 to the SMF 306. The SMF 306 uses the PCC rules 340 to define QoS flows with the appropriate steering rules and apply QoS enforcement via the I-UPF to the session established with the UE 314. In one or more embodiments, the SMF 306 performs this by creating PDR rules 342.

In one or more embodiments, the PDR rules define one or more of a packet filter rule, a route rule, a QoS, and a precedence value for each rule. Additional details of PDRs are provided in connection to FIGS. 5-7. The SMF 306 may then install the PDR rules in the I-UPF 302 and send a session establishment acceptance 344 to the UE 314. The UE 314 may then send a data packet 346 to the I-UPF 302 where a traffic steering engine 324 is configured to route the packet 346 based on the installed PDR rules. Indeed, the I-UPF 302 examines the packet attributes of the data packet 346 against at least one of the packet detection rules installed to the I-UPF 302. When the packet attributes match one of the packet detection rules, the I-UPF may route the data packet 346 in accordance with a forwarding action rule (FAR) attached to the matching packet detection rule. For example, if the packet attributes match with a packet detection rule that has a FAR to a data network **320*b* including an AS 304*b*, the I-UPF 302 will forward the data packet 346 to a router 332*b* on the data network 320*b*. In another example, if the packet attributes match with a packet detection rule that has a FAR to a core network, the I-UPF 302 will forward the data packet 346 to the core network. Examples of the traffic steering process is further discussed in connection with FIGS. 5-7**.

Figure 4:
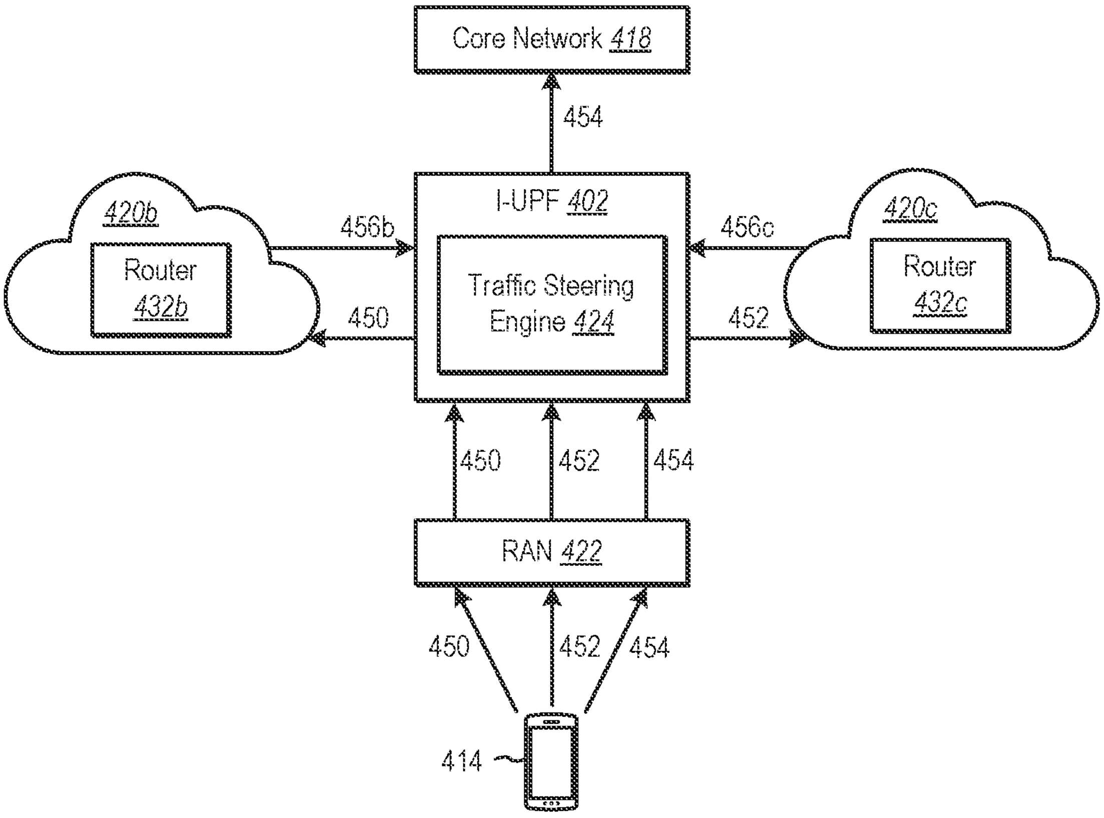
FIG. 4 illustrates another example workflow in which network traffic is steered to one or more local data networks in accordance with one or more embodiments.

FIG. 4 illustrates an example of steering traffic to one or more local data networks when the traffic steering instructions are locally stored by the I-UPF, in accordance with at least one or more embodiments. As discussed in connection with FIG. 2, in one or more embodiments, an I-UPF 402 may install locally the route rules and the packet filter rules provided by a data network the I-UPF has direct connection to. As shown in FIG. 4, a router **432*b* in a data network 420*b* may deliver packet filter rules 456*b* (e.g., IP address/IP prefix) and routing information 456*b* (e.g., network instance, community attribute, extended community attribute, and/or AS-specific extended community attribute) via a routing protocol to the I-UPF 402, where they are installed as packet detection rules (PRDs). Similarly, a router 432*c* in a data network 420*c* may deliver IP prefixes or IP addresses (packet filter rules 456*c*) and the related network instance, community attribute, extended community attribute, and/or AS-specific extended community attribute (routing information 456*c*) via a routing protocol to the I-UPF 402** where they also get installed.

In one or more embodiments, a UE 414 establishes a connection with the I-UPF 402 via a RAN 422. When a first data packet 450 from the UE 414 is received, a traffic steering engine 424 of the I-UPF 402 examines the packet attributes of the first data packet 450 against at least one of the packet detection rules installed to the I-UPF 402. When the packet attributes match with one of the packet detection rules, the I-UPF may route the first data packet 450 in accordance with a forwarding action rule (FAR) attached to the matching packet detection rule. For example, as shown in FIG. 4, the packet attributes of the first data packet 450 match with a packet detection rule that has a FAR to the data network **420*b*, and the I-UPF 402 forwards the first data packet 450 to the data network 420*b*. A second data packet 452 is received by the I-UPF 402 having packet attributes that match with a packet detection rule that has a FAR to the data network 420*c*. The I-UPF 402 forwards the second data packet 452 to the data network 420*c*. A third data packet 454 is received by the I-UPF 402 wherein the third data packet 454 has packet attributes matching with a packet detection rule that has a FAR to a core network 418. Hence, in this example, the I-UPF 402 will forward the third data packet 454 to the core network 418**.

As noted above, one or more embodiments described herein involve routing or otherwise steering network traffic through a telecommunications network in accordance with packet attributes and based on a comparison of the packet attributes to one or more PDRs. As will be discussed below in connection with example use cases shown in FIGS. 5-7, features described herein relate specifically to PDRs including a route rule having a routing tag and where network traffic is steered based at least in part on a comparison of the packet attributes to the route rule. Additional information will be discussed in connection with each of these example implementations. Moreover, for aid in explanation, the below use-cases will be discussed in connection with components illustrated in the example environment described above in connection with FIG. 2.

Figure 5:
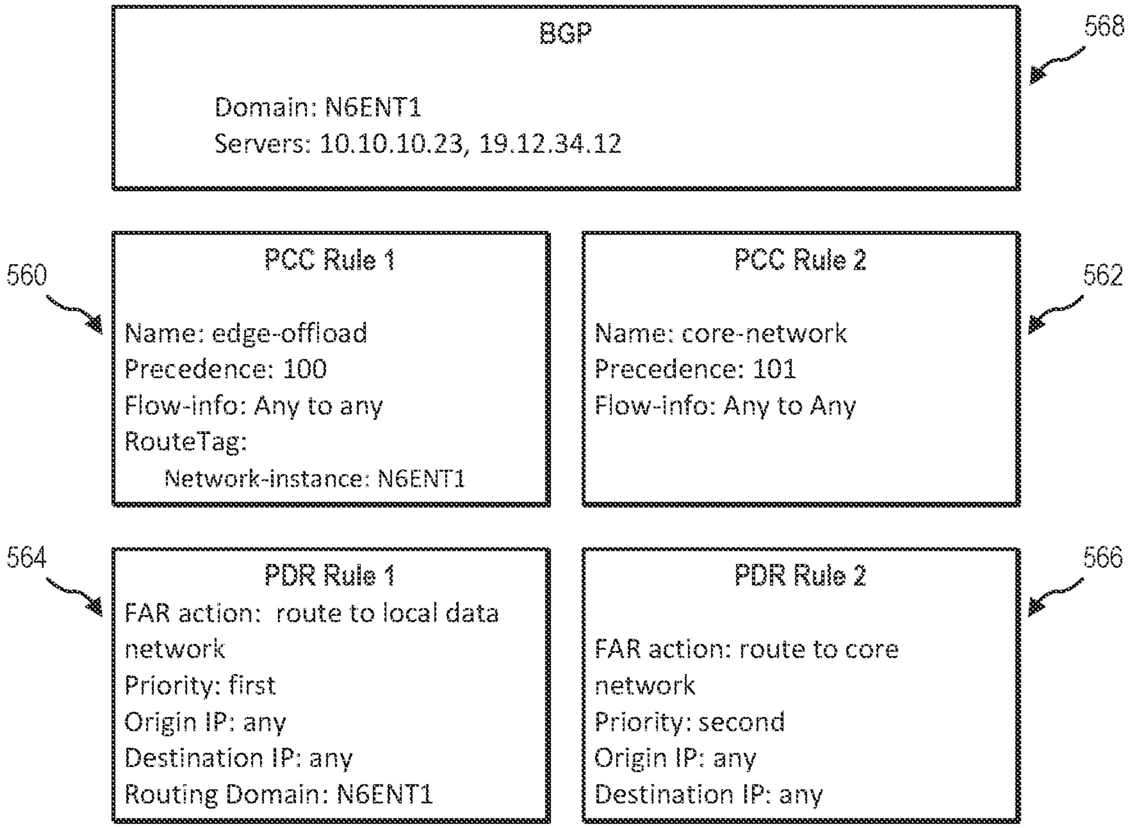
FIG. 5 illustrates an example use case involving traffic steering based on a route rule in accordance with one or more embodiments.

FIG. 5 illustrates a simple traffic steering use case using a network instance as a route rule, in accordance with one or more embodiments. In one or more embodiments, a data network, such as the data network **220*b* of FIG. 2, has advertised an edge network servers 10.10.10.23 and 19.12.34.12 via a routing domain N6ENT1 with route rule 568 being stored by the core network. A PCF, such as the PCF 210 of FIG. 2, may deliver a first PCC rule 560 and a second PCC rule 562 to a SMF, such as the SMF 206 of FIG. 2. As shown in FIG. 5, the name of each PCC rule indicates the FAR action to be taken. The first PCC rule 560 named "edge-offload" has a FAR action to a data network located on the edge network, such as the data network 220*b* on FIG. 2. Similarly, the second PCC rule 562 named "core-network" has a FAR action to a core network, such as the core network 218 in FIG. 2**.

Each of the PCC rules further include a precedence value. The precedence value determines the order in which each rule may be evaluated. The evaluation of each rule is performed in increasing order of their precedence value. As shown in FIG. 5, the first PCC rule 560 has a precedence value of 100 whereas the second PCC rule 562 has a precedence value of 101. Therefore, the first PCC rule 560 is evaluated first as it has a lower precedence value, before the second PCC rule 562 that has a higher precedence value.

The PCC rule may further include flow-information. The flow information identifies a possible packet filter rule (e.g., an IP prefix or IP address) associated with the rule. In one or more embodiments, the flow information may identify an origin and a destination IP prefix or IP address of the data packet. Here, for simplicity, there is no packet filter rule associated with the PCC rules and therefore, the flow information of both PCC rules is "any to any", i.e., meaning that the rule will apply to all packets regardless of where they originate or what their destination is.

As shown in FIG. 5, the first PCC rule 560 further includes a route tag. The route tag identifies a network instance, which, in the example shown in FIG. 5, is a routing domain identification. In one or more embodiments, the SMF converts the PCC rules to packet detection rules and installs them at the I-UPF located at the same edge network as the data network **220*b*. The first PDR rule 564 is based on the first PCC rule 560 and provides the following: packets originating from any origin and destined to any destination (e.g., the packet filter rule) having a routing domain identifier of N6ENT1 (e.g., the route rule) will be routed to the local data network. The second PDR rule 566 is based on the second PCC rule and provides the following: packets originating from any origin and destined to any destination (e.g., the packet filter rule) are to be routed to the core network. When a data packet is received by the I-UPF, the I-UPF will examine the packet attributes of the data packet against the first PDR rule 564. For example, if the data packet is sent to 10.10.10.23 address, the UPF identifies that the 10.10.10.23 address is advertised by routing domain N6ENT1 and forwards the data packet to the local data network having a routing domain N6ENT1 in accordance with the PDR rule 1 564. In another example, if the data packet is sent to 10.10.10.25, the first PDR rule 564 will not match as the 10.10.10.25 address is not in the N6ENT1 routing domain. The I-UPF may then match it with the second PDR rule 566**, as the packet filter rule "any to any" will match, and the I-UPF forwards the data packet to the core network according to the FAR action.

Figure 6:
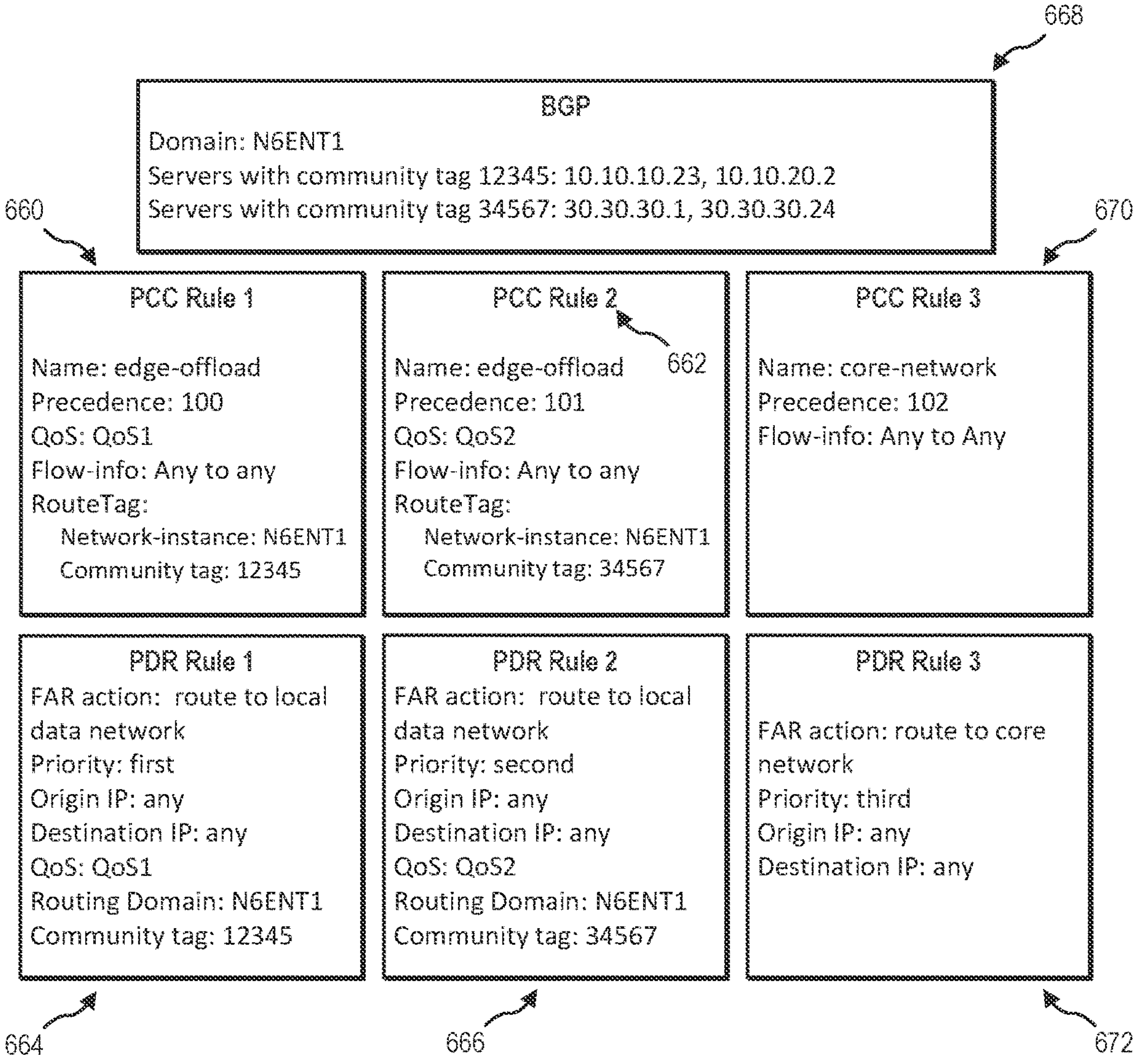
FIG. 6 illustrates another example use case involving traffic steering based on a route rule in accordance with one or more embodiments.

FIG. 6 illustrates another traffic steering use case using a network instance and a community attribute as a route rule, in accordance with one or more embodiments. In one or more embodiments, a data network, such as the data network 220*b* of FIG. 2, has advertised network servers 10.10.10.23 and 10.10.20.2 having a community attribute 12345 and network servers 30.30.30.1 and 30.30.30 24 having a community attribute 34567 via a routing domain N6ENT1 and this route rule 668 has been stored by the core network. A PCF, such as the PCF 210 of FIG. 2, may deliver a first PCC rule 660, a second PCC rule 662, and the third PCC rule 670 to a SMF, such as the SMF 206 of FIG. 2. As shown in FIG. 6, the name of each PCC rule indicates the FAR action to be taken. The first PCC rule 660 and the second PCC rule 662 named "edge-offload" has a FAR action to a data network located on the edge network, such as the data network 220*b* on FIG. 2. Similarly, the third PCC rule 670 named "core-network" has a FAR action to a core network, such as the core network 218 in FIG. 2. Each of the PCC rules further Include a precedence value.

As shown in FIG. 6, the first PCC rule 660 has a precedence value of 100, the second PCC rule 662 has a precedence value of 101, and the third PCC rule 670 has a precedence value of 102. Therefore, the first PCC rule 660 is evaluated first, then the second PCC rule 662, and finally the third PCC rule 670 until a match is found. As shown in FIG. 6, the packet filter rule for all three PCC rules applies to all packages (e.g., from any origin to any destination).

As further shown in FIG. 6, the first PCC rule 660 includes a route tag. The route tag of first PCC rule 660 identifies a network instance N6ENT1 as routing domain and a community attribute 12345 and applies a QoS1 to packets under this rule. The second PCC rule 662 also includes network instance N6ENT1 as routing domain and a second type of community attribute 34567 with a QoS2 to be applied to packets under this rule. The third PCC rule 670 only includes a packet filter rule but no route rule.

In one or more embodiments, the SMF converts the PCC rules to packet detection rules and installs them at the I-UPF located at the same edge network as the data network 220*b*. The first PDR rule 664 is based on the first PCC rule 660 and provides the following: packets originating from any origin and destined to any destination (e.g., the packet filter rule) having a routing domain identifier of N6ENT1 and community attribute of 12345 will be routed to the local data network using QoS1. The second PDR rule 666 is based on the second PCC rule 662 and provides the following: packets originating from any origin and destined to any destination (e.g., the packet filter rule) having a routing domain identifier of N6ENT1 and community attribute of 34567 will be routed to the local data network using QoS2. The third PDR rule 670 is based on the third PCC rule and provides the following: packets originating from any origin and destined to any destination (e.g., the packet filter rule) are to be routed to the core network.

When a data packet is received by the I-UPF, the I-UPF will examine the packet attributes of the data packet against the first PDR rule 664. For example, if the data packet is sent to the 10.10.10.23 address, the UPF identifies that the 10.10.10.23 address is advertised by routing domain N6ENT1 and that it belongs to community attribute 12345 and forwards the data packet to the local data network using QoS1 in accordance with the PDR rule 1 664.

In another example, if the data packet is sent to the 30.30.30.1 address, the first PDR rule 664 will not match, as the 30.30.30.1 address is in the N6ENT1 routing domain, but it does not have community attribute 12345. The I-UPF may then match it with the second PDR rule 666, as the 30.30.30.1 is in routing domain N6ENT1 and having community attribute 34567. The I-UPF may then forward the data packet to the local data network using QoS2. In yet another example, if the data packet is sent to the 10.10.10.1 address, neither the first PDR rule 664 nor the second PDR rule 666 will match, as the 10.10.10.1 address is not located in the N6ENT1 routing domain, hence, the third PDR rule 672 having a packet filter rule "any to any" will match, and the I-UPF forwards the data packet to the core network according to the FAR.

Figure 7:
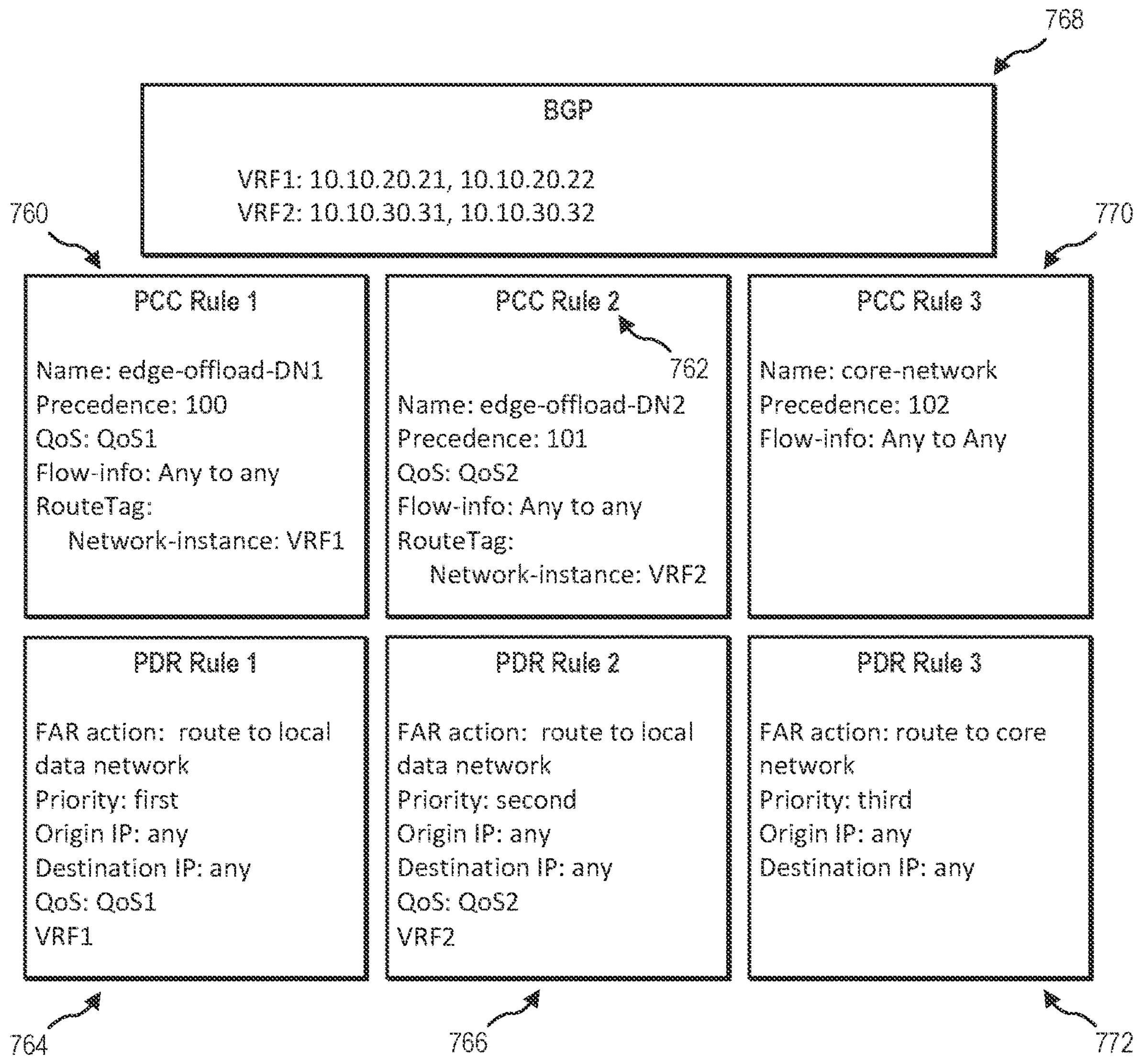
FIG. 7 illustrates yet another example use case involving traffic steering based on a rule in accordance with one or more embodiments.

FIG. 7 illustrates another traffic steering use case using a network instance as a route rule, in accordance with one or more embodiments. In one or more embodiments, a data network, such as the data network 220*b* of FIG. 2, has advertised network servers 10.10.20.21 and 10.10.10.22 with a VRF1, and a data network, such as the data network 220*c* of FIG. 2, has advertised network servers 10.10.30.31 and 10.10.30. 32 with a VRF2 and both of these route rules 768 have been stored by the core network. A PCF, such as the PCF 210 of FIG. 2, may deliver a first PCC rule 760, a second PCC rule 762, and a third PCC rule 770 to a SMF, such as the SMF 206 of FIG. 2. As shown in FIG. 7, the name of each PCC rule indicates the FAR action to be taken. The first PCC rule 760 named "edge-offload-DN1" has a FAR action to a data network located on the edge network, such as the data network 220*b* on FIG. 2. The second PCC rule 762 named "edge-offload-DN2" has a FAR action to a data network located on the edge network, such as the data network 220*c* on FIG. 2. Similarly, the third PCC rule 770 named "core-network" has a FAR action to a core network, such as the core network 218 in FIG. 2. Each of the PCC rules further include a precedence value. As shown in FIG. 7, the first PCC rule 760 has a precedence value of 100, the second PCC rule 762 has a precedence value of 101, and the third PCC rule 770 has a precedence value of 102. Therefore, the first PCC rule 760 is evaluated first, then the second PCC rule 762, and finally the third PCC rule 770. As shown in FIG. 7, the packet filter rule for all three PCC rules applies to all packages (e.g., from any origin to any destination). As shown in FIG. 7, the first PCC rule 760 includes a route tag. The route tag of the first PCC rule 760 identifies a VRF1 and applies a QoS1 to packets under this rule. The second PCC rule 762 identifies a VRF2 and applies a QoS2 to data packets. The third PCC rule 770 only includes a packet filter but no route tag.

In one or more embodiments, the SMF converts the PCC rules to packet detection rules and installs them at the I-UPF located at the same edge network as the data network 220*b* and data network 220*c* who have provided their VRF's to the telecommunication network. The first PDR rule 764 is based on the first PCC rule 760 and provides the following: packets originating from any origin and destined to any destination (e.g., the packet filter rule) included on VRF1 (e.g., the route rule) will be routed to the local data network using QoS1. The second PDR rule 766 is based on the second PCC rule 762 and provides the following: packets originating from any origin and destined to any destination (e.g., the packet filter rule) included on VRF2 will be routed to the local data network using QoS2. The third PDR rule 770 is based on the third PCC rule and provides the following: packets originating from any origin and destined to any destination (e.g., the packet filter rule) are to be routed to the core network.

When a data packet is received by the I-UPF the I-UPF will examine the packet attributes of the data packet against the first PDR rule 764. For example, if the data packet is sent to the 10.10.10.21 address, the UPF identifies that the 10.10.10.21 address is included on VRF1 and forwards the data packet to the local data network using QoS1 in accordance with the PDR rule 1 764. In another example, if the data packet is sent to the 10.10.30.31 address, the first PDR rule 764 will not match, as the 10.10.30.31 address is not in VRF1. The I-UPF may then match it with the second PDR rule 766, as the 10.10.30.31 address is part of the VRF1. The I-UPF may then forward the data packet to the local data network using QoS2. In yet another example, if the data packet is sent to the 10.10.10.1 address, neither the first PDR rule 764 nor the second PDR rule 766 will match, as the 10.10.10.1 address is not part of VRF1 nor VRF2, hence, the third PDR rule 772 having a packet filter rule "any to any" will match, and the I-UPF forwards the data packet to the core network according to the FAR.

Figure 8:
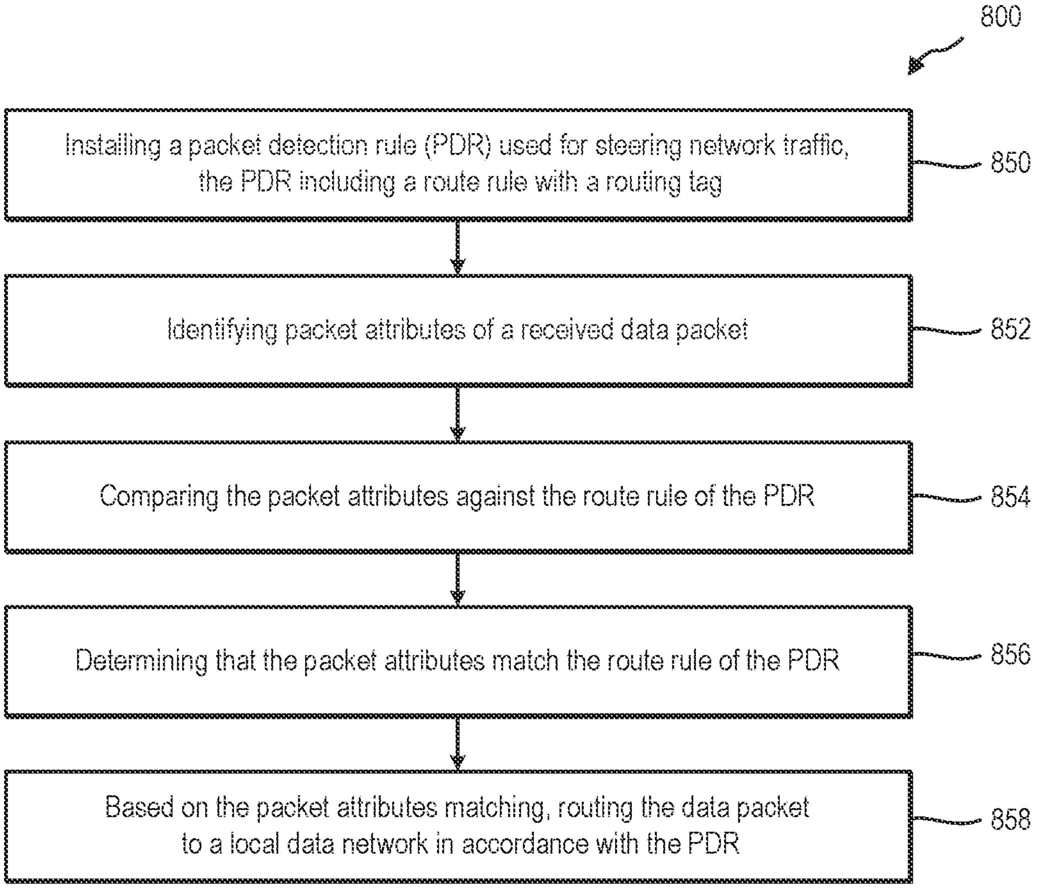
FIG. 8 illustrates an example series of acts for steering network traffic in accordance with traffic steering rules, in accordance with one or more embodiments.

FIG. 8 illustrates a series of acts 800 for steering network traffic in accordance with traffic steering rules, in accordance with one or more embodiments. While FIG. 8 illustrates acts according to one or more embodiments, alternative embodiments may omit, add to, reorder, and/or modify any of the acts shown in FIG. 8. The acts of FIG. 8 can be performed as part of a method. Alternatively, a system can perform the acts of FIG. 8.

As shown in FIG. 8, the series of acts 800 includes an act 850 of installing a packet detection rule (PRD) used for steering network traffic, the PDR including a route rule with a routing tag. In one or more embodiments, the PDR is installed at a UPF. In one or more embodiments, the act 850 includes installing, at the UPF, a packet detection rule (PDR) including instructions used for steering network traffic, the PDR including a route rule with a routing tag. As further shown, the series of acts 800 includes an act 852 of identifying packet attributes of a received data packet. For example, the UPF may receive a data packet and identify one or more packet attributes of the data packet. As further shown, the series of acts 800 includes an act 854 of comparing the packet attributes against the route rule of the PDR. As further shown, the series of acts 800 includes an act 856 of determining that the packet attributes match the route rule of the PDR. For example, the UPF may determine, based on comparing the one or more packet attributes against the route rule, that the one or more packet attributes match the route rule of the PDR. As further shown, the series of acts 800 includes an act 858 of based on the packet attributes matching, routing the data packet to a local data network in accordance with the PDR. In one or more embodiments, based on determining that the one or more packet attributes match the route rule, routing the data packet in accordance with the instructions of the PDR. In one or more embodiments, routing the data packet includes steering the data packet to a local data network of an edge network of the telecommunications network.

In one or more embodiments, the one or more PDRs are received from a session management function (SMF). In one or more embodiments, the one or more PDRs are received from the SMF in conjunction with establishing a packet data unit (PDU) session.

In one or more embodiments, the one or more PDRs include a packet filter rule. In one or more embodiments, the series of acts 800 further includes an act of matching the one or more packet attributes to the first PDR when both the packet filter rule and the route rule are determined to match the one or more packet attributes.

In one or more embodiments, the route rule is received from the local data network on the edge network via a routing protocol. In one or more embodiments, the routing tag includes one or more of a routing domain identifier, a virtual routing and forwarding (VRF) identifier, a community attribute, an extended community attribute, or an AS-specific extended community attribute. In an example, the routing tag includes the routing domain identifier, and wherein the method further comprises routing the data packet in accordance with the FAR attached to the first PDR based on determining that the one or more packet attributes match the routing domain identifier of the first PDR. In another example, the routing tag includes the community attribute, and wherein the method further comprises routing the data packet in accordance with the FAR attached to the first PDR based on determining that the one or more packet attributes match with the community attribute of the first PDR. In another example, the routing tag includes the routing domain identifier, and wherein the method further comprises routing the data packet in accordance with the FAR attached to the first PDR based on determining that the one or more packet attributes match with the routing domain identifier and the community attribute of the first PDR.

In one or more embodiments, the UPF and the local data network are located on the edge network of a cloud computing system where the core network is implemented at least in part on a datacenter of the cloud computing system. In one or more embodiments, the telecommunications network is a fifth generation (5G) mobile network. In one or more embodiments, the one or more packet attributes include one or more of an origin IP address, a destination IP address, an origin IP prefix, or a destination IP prefix.

The series of acts 800 may further include an act 856 of routing the data packet in accordance with a forwarding action rule (FAR) attached to the first PDR, wherein routing the data packet includes steering the data packet to one or more of a local data network of the edge network or a core network of the telecommunication network. For example, the telecommunication network may be a fifth generation (5G) mobile network.

Figure 9:
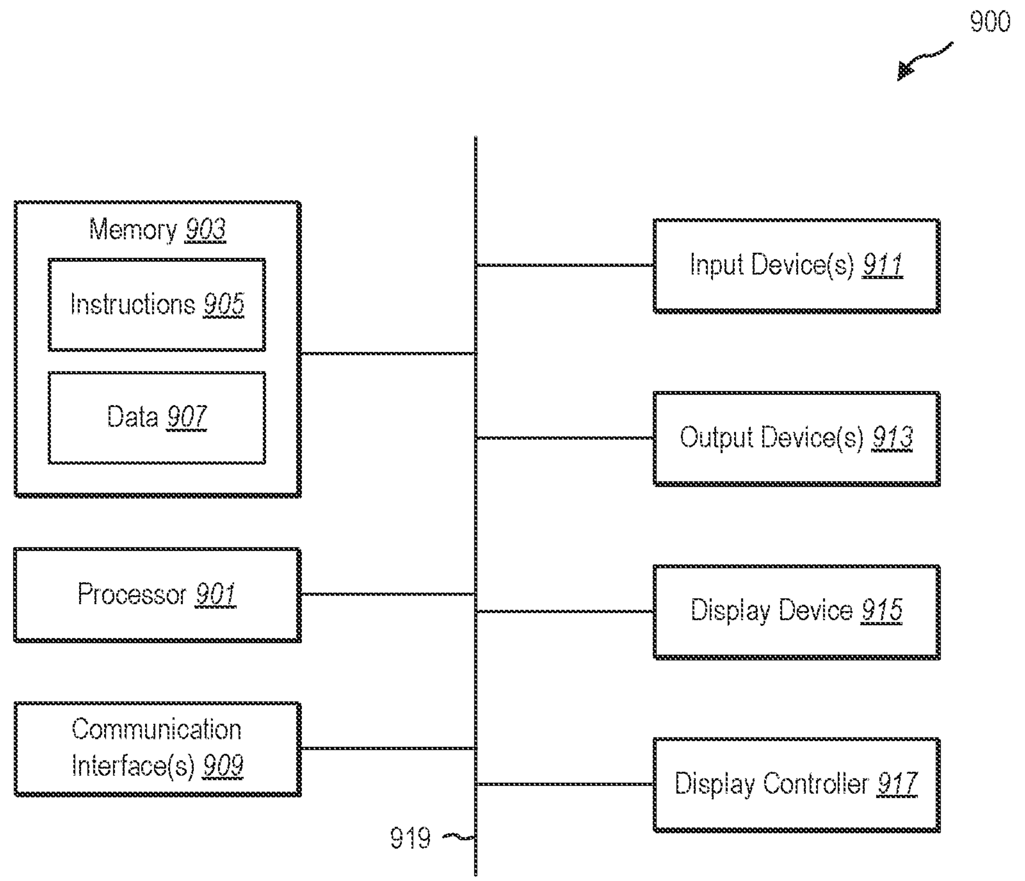
FIG. 9 illustrates certain components that may be included within a computer system.

FIG. 9 illustrates certain components that may be included within a computer system 900. One or more computer systems 900 may be used to implement the various devices, components, and systems described herein.

The computer system 900 includes a processor 901. The processor 901 may be a general-purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 901 may be referred to as a central processing unit (CPU). Although just a single processor 901 is shown in the computer system 900 of FIG. 9, in an alternative configuration, a combination of processors (e.g., an ARM and DSP) could be used.

The computer system 900 also includes memory 903 in electronic communication with the processor 901. The memory 903 may be any electronic component capable of storing electronic information. For example, the memory 903 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 905 and data 907 may be stored in the memory 903. The instructions 905 may be executable by the processor 901 to implement some or all of the functionality disclosed herein. Executing the instructions 905 may involve the use of the data 907 that is stored in the memory 903. Any of the various examples of modules and components described herein may be implemented, partially or wholly, as instructions 905 stored in memory 903 and executed by the processor 901. Any of the various examples of data described herein may be among the data 907 that is stored in memory 903 and used during execution of the instructions 905 by the processor 901.

A computer system 900 may also include one or more communication interfaces 909 for communicating with other electronic devices. The communication interface(s) 909 may be based on wired communication technology, wireless communication technology, or both. Some examples of communication interfaces 909 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 900 may also include one or more input devices 911 and one or more output devices 913. Some examples of input devices 911 include a keyboard, mouse, microphone, remote control device, button, joystick, trackball, touchpad, and lightpen. Some examples of output devices 913 include a speaker and a printer. One specific type of output device that is typically included in a computer system 900 is a display device 915. Display devices 915 used with embodiments disclosed herein may utilize any suitable image projection technology, such as liquid crystal display (LCD), light-emitting diode (LED), gas plasma, electroluminescence, or the like. A display controller 917 may also be provided, for converting data 907 stored in the memory 903 into text, graphics, and/or moving images (as appropriate) shown on the display device 915.

The various components of the computer system 900 may be coupled together by one or more buses, which may include a power bus, a control signal bus, a status signal bus, a data bus, etc. For the sake of clarity, the various buses are illustrated in FIG. 9 as a bus system 919.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database, or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. In a telecommunications network having a user plane function (UPF) configured to steer network traffic in accordance with traffic steering rules, a method comprising:

installing, at the UPF, a packet detection rule (PDR) including instructions used for steering network traffic, the PDR including:

a packet filter rule configured to identify packet flow characteristics of a data packet; and a route rule comprising a routing tag identifying routing metadata associated with a destination route corresponding to the data packet;

receiving, at the UPF, the data packet and identifying one or more packet attributes of the data packet;

determining, based on the one or more packet attributes, a destination route corresponding to the data packet;

determining the routing metadata associated with the destination route;

comparing the routing metadata against the routing tag of the route rule of the PDR;

determining, based on comparing the routing metadata against the routing tag of the route rule, that the routing metadata corresponds to the routing tag of the route rule; and routing the data packet in accordance with the instructions of the PDR, wherein routing the data packet includes steering the data packet to a local data network of an edge network of the telecommunications network based on the routing tag of the route rule.

2. The method of claim 1, wherein the PDR is received from a session management function (SMF).

3. The method of claim 2, wherein the PDR is received from the SMF in conjunction with establishing a packet data unit (PDU) session.

4. The method of claim 1, wherein the PDR includes a packet filter rule.

5. The method of claim 4, further comprising determining that the one or more packet attributes match the packet filter rule of the PDR, and wherein routing the data packet is further based on determining that the one or more packet attributes match the packet filter rule of the PDR.

6. The method of claim 1, wherein the route rule is received from the local data network on the edge network via a routing protocol.

7. The method of claim 1, wherein the routing tag includes one or more of a routing domain identifier, a virtual routing and forwarding (VRF) identifier, a community attribute, an extended community attribute, or an AS-specific extended community attribute.

8. The method of claim 1, wherein the routing tag includes a routing domain identifier, and wherein the method further comprises routing the data packet in accordance with a forwarding action rule (FAR) attached to the PDR based on determining that the one or more packet attributes match the routing domain identifier of the PDR.

9. The method of claim 1, wherein the routing tag includes a community attribute, and wherein the method further comprises routing the data packet in accordance with a forwarding action rule (FAR) attached to the PDR based on determining that the one or more packet attributes match with the community attribute of the PDR.

10. The method of claim 1, wherein the routing tag includes a routing domain identifier, and wherein the method further comprises routing the data packet in accordance with a forward actioning rule (FAR) attached to the PDR based on determining that the one or more packet attributes match with the routing domain identifier and a community attribute of the PDR.

11. The method of claim 1, wherein the UPF and the local data network are located on the edge network of a cloud computing system.

12. The method of claim 1, wherein the telecommunications network is a fifth generation (5G) mobile network.

13. The method of claim 1, wherein the one or more packet attributes include one or more of an origin IP address, a destination IP address, an origin IP prefix, or a destination IP prefix.

14. In a telecommunications network having a user plane function (UPF) configured to steer network traffic in accordance with traffic steering rules, a method comprising:
- installing, at the UPF, a plurality of packet detection rules (PDRs) including instructions used for steering network traffic, wherein at least one PDR of the plurality of PDRs include;
  - a packet filter rule configured to identify packet flow characteristics of a data packet; and
  - a route rule comprising a routing tag identifying routing metadata associated with a destination route corresponding to the data packet;
- receiving, at the UPF, the data packet and identifying one or more packet attributes of the data packet;
- determining, based on the one or more packet attributes, a destination route corresponding to the data packet;
- determining the routing metadata associated with the destination route;
- comparing the routing metadata against the routing tag of the route rule of the at least one PDR;
- determining, based on comparing the routing metadata against the routing tag of the route rule, that the routing metadata corresponds to the routing tag of the route rule; and
- routing the data packet to a local data network of an edge network in accordance with the instructions of the at least one PDR based on the routing tag of the route rule.

15. The method of claim 14, wherein the routing tag includes one or more of a routing domain identifier, a virtual routing and forwarding (VRF) identifier, a community attribute, an extended community attribute, or an AS-specific extended community attribute.

16. The method of claim 14, wherein the one or more packet attributes include one or more of an origin IP address, a destination IP address, an origin IP prefix, or a destination IP prefix.

17. The method of claim 14, wherein the plurality of PDRs are received from a session management function (SMF) in a core network of the telecommunications network implemented by a cloud computing system, and wherein the UPF and the local data network are located on the edge network of the cloud computing system.

18. A system, comprising:
- at least one processor;
- memory in electronic communication with the at least one processor; and
- instructions stored in the memory, the instructions being executable by the at least one processor to:
  - install, at a user plane function (UPF), a packet detection rule (PDR) including instructions used for steering network traffic, the PDR including:
    - a packet filter rule configured to identify packet flow characteristics of a data packet; and
    - a route rule comprising a routing tag identifying routing metadata associated with a destination route corresponding to the data packet;
  - receive, at the UPF, the data packet and identify one or more packet attributes of the data packet;
- determining, based on the one or more packet attributes, a destination route corresponding to the data packet;
- determining the routing metadata associated with the destination route;
  - compare the routing metadata against the routing tag of the route rule of the PDR;
  - determine, based on comparing the routing metadata against the routing tag of the route rule, that the routing metadata corresponds to the routing tag of the route rule; and
  - route, based on the routing tag of the route rule, the data packet in accordance with the instructions of the PDR, wherein routing the data packet includes steering the data packet to a local data network of an edge network.

19. The system of claim 18, wherein the route rule includes one or more of a routing domain identifier, a virtual routing and forwarding (VRF) identifier, a community attribute, an extended community attribute, or an AS-specific extended community attribute.

20. The system of claim 18, wherein the one or more packet attributes include one or more of an origin IP address, a destination IP address, an origin IP prefix, or a destination IP prefix.

* * * * *